Aug. 11, 1925.

L. METZGAR

WHEEL STRUCTURE

Filed Dec. 17, 1924

1,549,145

Inventor

Leroy Metzgar

By Cyrus W. Rice

Attorney

Patented Aug. 11, 1925.

1,549,145

UNITED STATES PATENT OFFICE.

LEROY METZGAR, OF GRAND RAPIDS, MICHIGAN.

WHEEL STRUCTURE.

Application filed December 17, 1924. Serial No. 756,469.

*To all whom it may concern:*

Be it known that I, LEROY METZGAR, a citizen of the United States, residing at Grand Rapids, in the county of Kent and State of Michigan, have invented new and useful Improvements in Wheel Structures, of which the following is a specification.

The present invention relates to wheel structures; and its object is, generally, to provide such a structure improved in various respects hereinafter appearing; and more particularly, to provide a wheel structure adaptable for use as a truck wheel, a sheave or pulley or other purposes, comprising fibrous blocks, their fiber extending radially of the structure, and being securely fastened together by improved means; and further, to provide in such a structure, a central rotative bearing formed by the inner ends of such blocks; and further, to provide an additional portion of such bearing formed of metal or other wear-resisting material; and further, to provide in such a structure having such blocks of porous material, lubricating means impregnated therein.

These and any other objects hereinafter appearing are attained by, and the invention finds preferable embodiment in, the structure hereinafter particularly described in the body of this specification and illustrated by the accompanying drawings, in which:—

Figure 1:
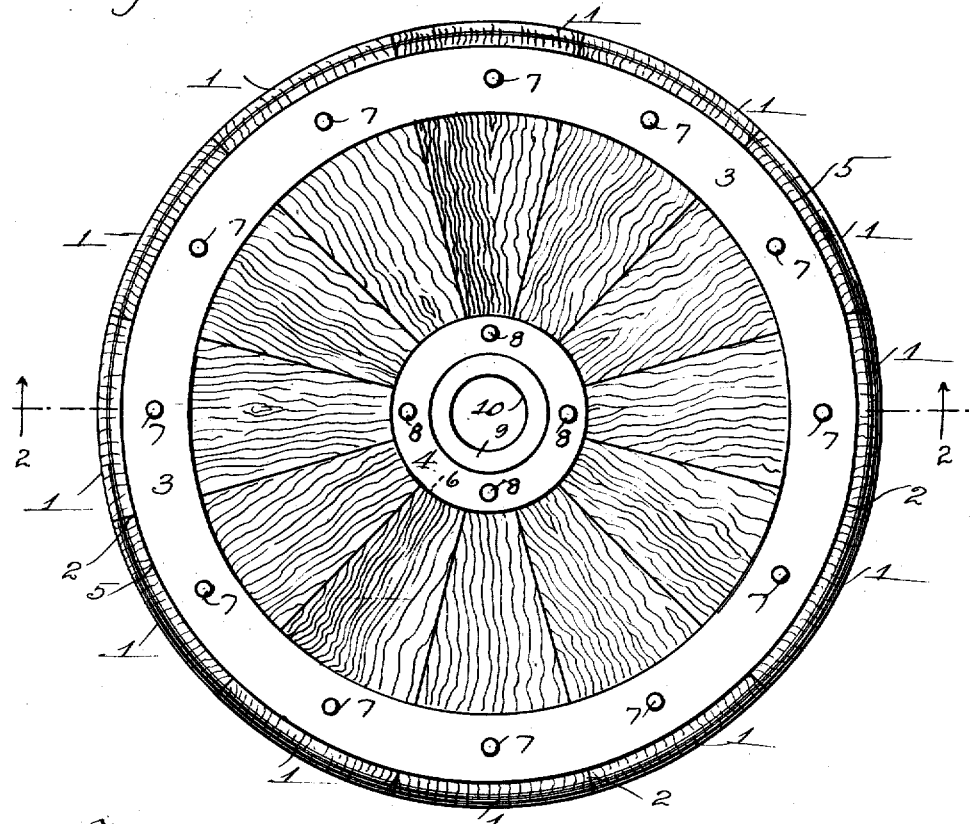
Figure 1 is a side view of a wheel structure.
Figure 3:
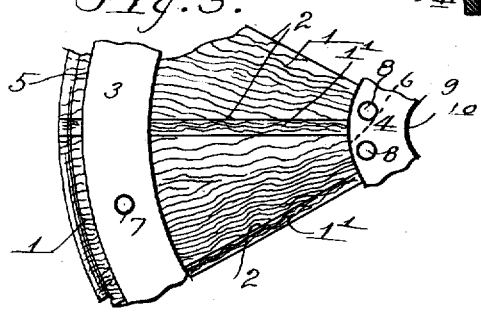
Figure 3 is a fragmentary side view of such a structure showing a modified construction.

In the drawings, a wheel structure particularly adapted for use as a wheel for a baggage truck and the like is shown. This structure comprises a plurality—twelve in the construction shown—of blocks 1 circularly-disposed, and formed of a fibrous material, as wood, the fibre extending in the wheel's radial direction as indicated in the drawings. These blocks taper at their mutually adjacent sides 2 toward the axis of the wheel's rotation, and fit tightly together. The blocks are tightly held together to form the wheel structure by rings 3 and 4, seated in recesses, in form of the rabbets 5 and 6 respectively, the rabbets 5 being formed on the wheel's opposite sides adjacent its periphery, and the rabbets 6 being formed on said sides adjacent the wheel's axis of rotation. The rings 3 are spaced inwardly from said periphery, so as to provide a tread portion of the wheel composed of the outer ends of the blocks, such provision rendering the tread portion more nearly noiseless in the wheel's travel over a pavement and also more resilient, than if the metallic ring 3 were in contact with such a pavement. These rings 3 and 4 are made of metal or other rigid and strong material and, when seated in their recesses or rabbets, securely hold the blocks in place, the rabbets 5 containing the rings 3 holding the blocks against outward radial movement and the rabbets 6 containing the rings 4 holding the same against inward radial movement. Inasmuch as the fibre or wood grain of these blocks extends radially, the blocks are not subject to expansion or contraction radially of the wheel. The rings 3 on the wheel's opposite sides and the rings 4 on said opposite sides are fastened together, and the blocks are more securely held in place with their mutually adjacent sides in close contact, by bolts 7 which extend through the opposite rings 3 and through each block, and the rings 4 on the wheel's opposite sides are similarly fastened together by bolts 8 extending through said rings 4 and through some of the blocks as shown, the various bolts being riveted at their ends or otherwise secured in place. Although I regard it desirable that the blocks be all of wedge-like or inwardly-tapering form as shown in Figure 1, such blocks may be interspersed with other blocks 1¹ whose sides are parallelly or otherwise disposed interrelatively, as shown in Figure 3.

Figure 2:
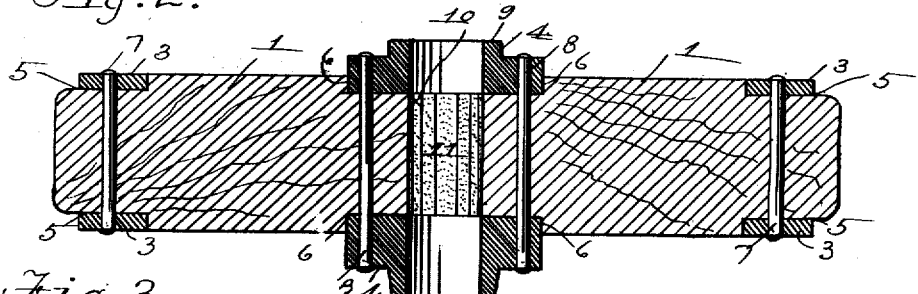
Figure 2 is a diametrical sectional view thereof taken on line 2—2 of Figure 1.

The rings 4 may be extended axially, as indicated in Figure 2, to the degree required to provide a hub portion 9 of desired length to turn on the wheel's axle. The wheel is centrally bored to provide a female rotative-bearing 10 for the axle (not shown) on which the wheel is mounted. This rotative bearing is formed, in part at least, by the inner ends 11 of the blocks, and inasmuch as the fibre and the pores of the blocks, (of wood or other fibrous and porous material) extend radially of the wheel, these blocks may be impregnated with a suitable lubricant, such as paraffine oil, so that in use this lubricant will exude from such pores to lubricate the bearing in the wheel's rotation on its axle. Graphite grease may be applied to these inner ends of the blocks to provide additional lubrication. Inasmuch as the tread of the wheel will soon become coated with dirt, etc. in practice, the lubricant will be prevented from exuding from the outer ends of the blocks and its exuding will be wholly from their inner ends.

This rotative bearing may be formed in part by the inner surfaces of the rings 4, this preventing the inner ends 11 of the blocks from wearing down too rapidly.

It will be seen that where the blocks are wedge-shaped as shown, they may be made of small and otherwise wasted wooden pieces.

The invention being intended to be pointed out in the claims, is not to be limited to or by details of construction of the particular embodiment thereof illustrated by the drawings or hereinbefore described.

I claim:

1. In a wheel structure: circularly-disposed fibrous blocks, whose fibre extends radially and which taper at their mutually adjacent sides toward the structure's axis of rotation and having recesses adjacent the structure's circumferential periphery and adjacent said axis respectively; rings fittingly seated in the recesses; means extending through the blocks and through the rings respectively for tightly fastening the blocks together and the rings in their recesses.

2. In a wheel structure: circularly-disposed fibrous blocks, whose fibre extends radially and which taper at their mutually adjacent sides toward the structure's axis of rotation and having circular rabbets in the structure's opposite sides adjacent its circumferential periphery and adjacent said axis respectively; rings fittingly seated in the rabbets; bolts extending through the blocks and through the rings respectively and secured thereto for tightly fastening the blocks together and the rings in their rabbets.

3. In a wheel structure: circularly-disposed fibrous blocks whose fibre extends radially and which taper at their mutually adjacent sides toward the structure's axis of rotation; the structure having a central female rotative-bearing formed in part by the inner ends of the blocks; rings secured to the opposite sides of the blocks and having a bore forming in part the said bearing.

4. In a wheel structure: circularly-disposed fibrous porous blocks whose fibre and pores extend radially and which taper at their mutually adjacent sides toward the structure's axis of rotation, the structure having a central female rotative-bearing formed by the inner ends of the blocks, the porous blocks being impregnated with a lubricant; means for tightly fastening the blocks together.

5. In a wheel structure: circularly-disposed fibrous porous blocks whose fibre and pores extend radially and which taper at their mutually adjacent sides toward the structure's axis of rotation, the porous blocks being impregnated with a lubricant, the structure having a central female rotative-bearing formed by the inner ends of the blocks and the blocks having recesses adjacent the structure's circumferential periphery and adjacent said axis respectively; rings fittingly seated in the recesses; bolts extending through the blocks and through the rings respectively for tightly fastening the blocks together and the rings in their recesses.

In testimony whereof I have hereunto set my hand at Grand Rapids, Michigan, this 29th day of November, 1924.

LEROY METZGAR.

on its axle. Graphite grease may be applied to these inner ends of the blocks to provide additional lubrication. Inasmuch as the tread of the wheel will soon become coated with dirt, etc. in practice, the lubricant will be prevented from exuding from the outer ends of the blocks and its exuding will be wholly from their inner ends.

This rotative bearing may be formed in part by the inner surfaces of the rings 4, this preventing the inner ends 11 of the blocks from wearing down too rapidly.

It will be seen that where the blocks are wedge-shaped as shown, they may be made of small and otherwise wasted wooden pieces.

The invention being intended to be pointed out in the claims, is not to be limited to or by details of construction of the particular embodiment thereof illustrated by the drawings or hereinbefore described.

I claim:

1. In a wheel structure: circularly-disposed fibrous blocks, whose fibre extends radially and which taper at their mutually adjacent sides toward the structure's axis of rotation and having recesses adjacent the structure's circumferential periphery and adjacent said axis respectively; rings fittingly seated in the recesses; means extending through the blocks and through the rings respectively for tightly fastening the blocks together and the rings in their recesses.

2. In a wheel structure: circularly-disposed fibrous blocks, whose fibre extends radially and which taper at their mutually adjacent sides toward the structure's axis of rotation and having circular rabbets in the structure's opposite sides adjacent its circumferential periphery and adjacent said axis respectively; rings fittingly seated in the rabbets; bolts extending through the blocks and through the rings respectively and secured thereto for tightly fastening the blocks together and the rings in their rabbets.

3. In a wheel structure: circularly-disposed fibrous blocks whose fibre extends radially and which taper at their mutually adjacent sides toward the structure's axis of rotation; the structure having a central female rotative-bearing formed in part by the inner ends of the blocks; rings secured to the opposite sides of the blocks and having a bore forming in part the said bearing.

4. In a wheel structure: circularly-disposed fibrous porous blocks whose fibre and pores extend radially and which taper at their mutually adjacent sides toward the structure's axis of rotation, the structure having a central female rotative-bearing formed by the inner ends of the blocks, the porous blocks being impregnated with a lubricant; means for tightly fastening the blocks together.

5. In a wheel structure: circularly-disposed fibrous porous blocks whose fibre and pores extend radially and which taper at their mutually adjacent sides toward the structure's axis of rotation, the porous blocks being impregnated with a lubricant, the structure having a central female rotative-bearing formed by the inner ends of the blocks and the blocks having recesses adjacent the structure's circumferential periphery and adjacent said axis respectively; rings fittingly seated in the recesses; bolts extending through the blocks and through the rings respectively for tightly fastening the blocks together and the rings in their recesses.

In testimony whereof I have hereunto set my hand at Grand Rapids, Michigan, this 29th day of November, 1924.

LEROY METZGAR.

DISCLAIMER 1,549,145.—*Leroy Metzgar*, Grand Rapids, Mich. WHEEL STRUCTURE. Patent dated August 11, 1925. Disclaimer filed August 1, 1931, by the patentee.

Therefore enters this disclaimer to that part of the claims in said specification which is in the following words, to-wit:

"1. In a wheel structure: circularly-disposed fibrous blocks, whose fibre extends radially and which taper at their mutually adjacent sides toward the structure's axis of rotation and having recesses adjacent the structure's circumferential periphery and adjacent said axis respectively; rings fittingly seated in the recesses; means extending through the blocks and through the rings respectively for tightly fastening the blocks together and the rings in their recesses.

"2. In a wheel structure: circularly-disposed fibrous blocks, whose fibre extends radially and which taper at their mutually adjacent sides toward the structure's axis of rotation and having circular rabbets in the structure's opposite sides adjacent its circumferential periphery and adjacent said axis respectively; rings fittingly seated in the rabbets; bolts extending through the blocks and through the rings respectively and secured thereto for tightly fastening the blocks together and the rings in their rabbets."

[*Official Gazette August 25, 1931.*]

DISCLAIMER 1,549,145.—*Leroy Metzgar*, Grand Rapids, Mich. WHEEL STRUCTURE. Patent dated August 11, 1925. Disclaimer filed August 1, 1931, by the patentee.

Therefore enters this disclaimer to that part of the claims in said specification which is in the following words, to-wit:

"1. In a wheel structure: circularly-disposed fibrous blocks, whose fibre extends radially and which taper at their mutually adjacent sides toward the structure's axis of rotation and having recesses adjacent the structure's circumferential periphery and adjacent said axis respectively; rings fittingly seated in the recesses; means extending through the blocks and through the rings respectively for tightly fastening the blocks together and the rings in their recesses.

"2. In a wheel structure: circularly-disposed fibrous blocks, whose fibre extends radially and which taper at their mutually adjacent sides toward the structure's axis of rotation and having circular rabbets in the structure's opposite sides adjacent its circumferential periphery and adjacent said axis respectively; rings fittingly seated in the rabbets; bolts extending through the blocks and through the rings respectively and secured thereto for tightly fastening the blocks together and the rings in their rabbets."

[*Official Gazette August 25, 1931.*]